United States Patent
Park et al.

(10) Patent No.: US 10,042,906 B2
(45) Date of Patent: Aug. 7, 2018

(54) APPARATUS AND METHOD FOR DATA PROCESSING

(71) Applicant: Electronics and Telecommunications Research Institute, Daejeon (KR)

(72) Inventors: Hyeon Park, Daejeon (KR); Dae Heon Park, Daejeon (KR); Hyun Hak Kim, Daejeon (KR); Eun Ju Lee, Daejeon (KR); Tae Wook Heo, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 357 days.

(21) Appl. No.: 14/841,020

(22) Filed: Aug. 31, 2015

(65) Prior Publication Data
US 2016/0179913 A1    Jun. 23, 2016

(30) Foreign Application Priority Data

Dec. 23, 2014 (KR) .................. 10-2014-0187219

(51) Int. Cl.
*G06F 17/30* (2006.01)
(52) U.S. Cl.
CPC .. *G06F 17/30569* (2013.01); *G06F 17/30312* (2013.01); *G06F 17/30572* (2013.01)
(58) Field of Classification Search
CPC ......... G06F 17/30569; G06F 17/30312; G06F 17/30572
USPC ....................................................... 707/756
See application file for complete search history.

(56) References Cited

U.S. PATENT DOCUMENTS

| | | | | |
|---|---|---|---|---|
| 5,506,965 A | * | 4/1996 | Naoe | .......................... H04L 5/16 370/296 |
| 2009/0222596 A1 | * | 9/2009 | Flynn | ...................... G06F 3/061 710/22 |
| 2010/0295856 A1 | * | 11/2010 | Ferreira | ..................... G06T 1/00 345/441 |
| 2011/0016157 A1 | | 1/2011 | Bear et al. | |

(Continued)

FOREIGN PATENT DOCUMENTS

| KR | 1020140096936 A | 8/2014 |
| KR | 1020140104544 A | 8/2014 |
| KR | 1020140120428 A | 10/2014 |

OTHER PUBLICATIONS

Hyunhak Kim et al., EDEN: Environmental Disasters Early-perceptioN Platform Based on Big-Data and DBMS, 2015 International Conference on Platform Technology and Service (Platcon-15), Feb. 11, 2015, pp. 212-213.

*Primary Examiner* — Phong H Nguyen
(74) *Attorney, Agent, or Firm* — William Park & Associates Ltd.

(57) ABSTRACT

Provided herein is an apparatus for data processing, the apparatus including a receiving module configured to receive first data; a data processing module configured to process the first data received from the receiving module, to generate second data including meta data of the first data, and third data including the first data with its data type changed to an array type; and a mapping module configured to change a system of the first data and second data received from the data processing module to generate fourth data and fifth data, and to generate sixth data including mapping data of between the first data and fourth data and between the second data and fifth data.

10 Claims, 3 Drawing Sheets

(56) References Cited

U.S. PATENT DOCUMENTS

| | | | |
|---|---|---|---|
| 2011/0296133 A1* | 12/2011 | Flynn | G06F 11/1048 |
| | | | 711/171 |
| 2013/0166556 A1* | 6/2013 | Baeumges | G06F 17/30339 |
| | | | 707/737 |
| 2013/0326535 A1* | 12/2013 | Matsuda | G06F 9/50 |
| | | | 718/104 |
| 2014/0012800 A1 | 1/2014 | Etri | |
| 2014/0297826 A1 | 10/2014 | Etri | |

\* cited by examiner

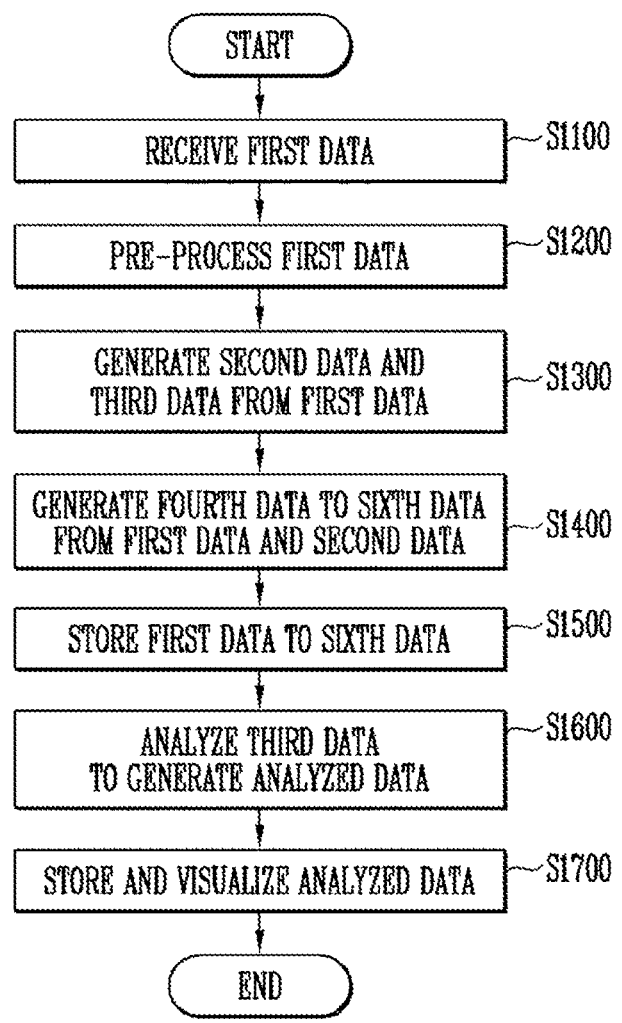

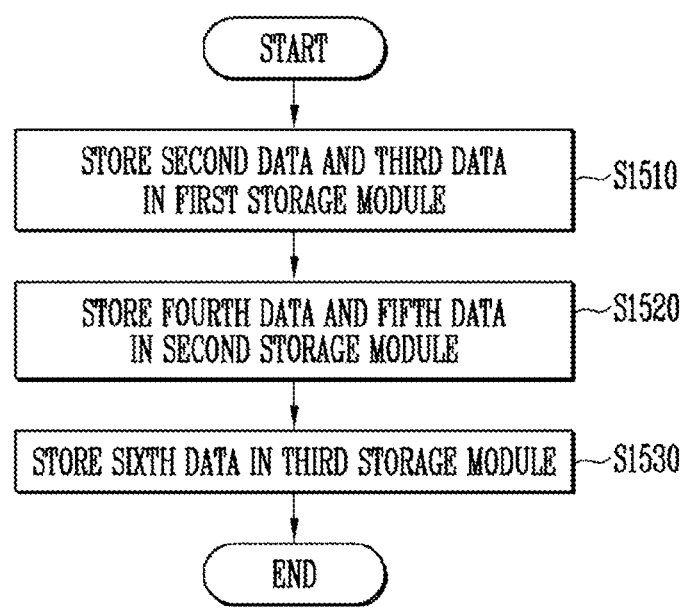

APPARATUS AND METHOD FOR DATA PROCESSING

CROSS-REFERENCE TO RELATED APPLICATION

This application claims priority to and the benefit of Korean Patent Application No. 10-2014-0187219, filed on Dec. 23, 2014, in the Korean Intellectual Property Office, the entire contents of which are incorporated herein by reference in their entirety.

BACKGROUND

Field of Invention

Various embodiments of the present invention relate to a data processing apparatus for receiving or storing data, and a data processing method thereof.

Description of Related Art

As the advantage of collecting, analyzing, and visualizing mass data in real time becomes well known, interest in big data is increasing.

Especially, research is ongoing to receive mass data from a plurality of satellites, and to analyze the mass data in real time in various aspects. However, when analyzing the received mass data in various aspects, data processing is necessary such as changing the format of the data every time the data is being analyzed, and thus it takes much time. Furthermore, it is not possible to efficiently store meta data such as the photographing time, coordinates, and resolution and the like of the mass data.

SUMMARY

A purpose of various embodiments of the present disclosure is to resolve the aforementioned problems, that is, to provide an apparatus for data processing capable of extracting meta data in real time and changing the format of the data while receiving the mass data, and a method thereof.

Another purpose of the various embodiments of the present disclosure is to provide an apparatus where data is dispersedly stored and thus having improved data stability.

According to an embodiment of the present invention, there is provided an apparatus for data processing, the apparatus including a receiving module configured to receive first data; a data processing module configured to process the first data received from the receiving module, to generate second data including meta data of the first data, and third data including the first data with its data type changed to an array type; and a mapping module configured to change a system of the first data and second data received from the data processing module to generate fourth data and fifth data, and to generate sixth data including mapping data of between the first data and fourth data and between the second data and fifth data.

According to the embodiment, the apparatus may further include a first storage module configured to store the second data and third data from the data processing module; a second storage module configured to store the fourth data and fifth data from the mapping module; and a third storage module configured to store the sixth data from the mapping module, wherein the second storage module may include a master node, first slave node and second slave node, the master node transmitting at least a portion of the fourth data and fifth data from the mapping module to the first slave node and second slave node, respectively, and the first slave node and second slave node may repeatedly store the at least a portion of the fourth data and fifth data.

According to the embodiment, the apparatus may further include an analyzing module configured to analyze the third data to generate analyzed data; and a visualizing module configured to visualize the analyzed data, wherein the second storage module ma further store the analyzed data, and the first slave node and second slave node may repeatedly store the at least a portion of the analyzed data, and the second storage module may transmit the analyzed data to the visualizing module.

According to the embodiment, the first storage module may include a first storage cluster that stores the second data, and a second storage cluster that stores the third data.

According to the embodiment, the receiving module may include a pre-processing module for pre-processing the first data.

According to another embodiment of the present disclosure, there is provided a method for data processing, the method including receiving first data; generating second data and third data from the first data; and generating fourth data to sixth data from the first data and second data, wherein at the generating second data and third data, the second data is generated by extracting meta data of the first data, and the third data is generated by changing a data type of the first data to an array type, and at the generating fourth data to sixth data, the fourth data and fifth data are generated by changing a system of the first data and second data, and the sixth data includes mapping data of between the first data and fourth data and between the second data and fifth data.

According to the embodiment, the method may further include pre-processing the first data after the receiving first data, and the pre-processing the first data is performed prior to the generating second data and third data from the first data.

According to the embodiment, the storing first data to sixth data may include storing the second data and third data in a first storage module; storing the fourth data and fifth data in a second storage module; and storing the sixth data in a third storage module.

According to the embodiment, at the storing the fourth data and fifth data in the second storage module, the at least a portion of the fourth data and fifth data may be repeatedly stored in the second storage module.

According to the embodiment, the method may further include, after the storing the first data to third data, analyzing the third data to generate analyzed data; and storing and visualizing the analyzed data.

According to the embodiment, at the storing and visualizing the analyzed data, at least a portion of the analyzed data may be repeatedly stored in the second storage module.

An apparatus for data processing according to an embodiment of the present disclosure and a method thereof may extract meta data in real time and change the format of the data while receiving mass data.

Furthermore, by an apparatus for data processing according to an embodiment of the present disclosure and a method thereof, data is dispersedly stored and thus has improved data stability.

BRIEF DESCRIPTION OF THE DRAWINGS

The above and other features and advantages of the present invention will become more apparent to those of ordinary skill in the art by describing in detail embodiments with reference to the attached drawings in which:

FIG. 2 is a flowchart for explaining a method for data processing according to an embodiment of the present disclosure; and FIG. 3 is a flowchart for explaining in detail a step of storing first data to third data of the method for data processing of FIG. 2.

DETAILED DESCRIPTION

Figure 1:
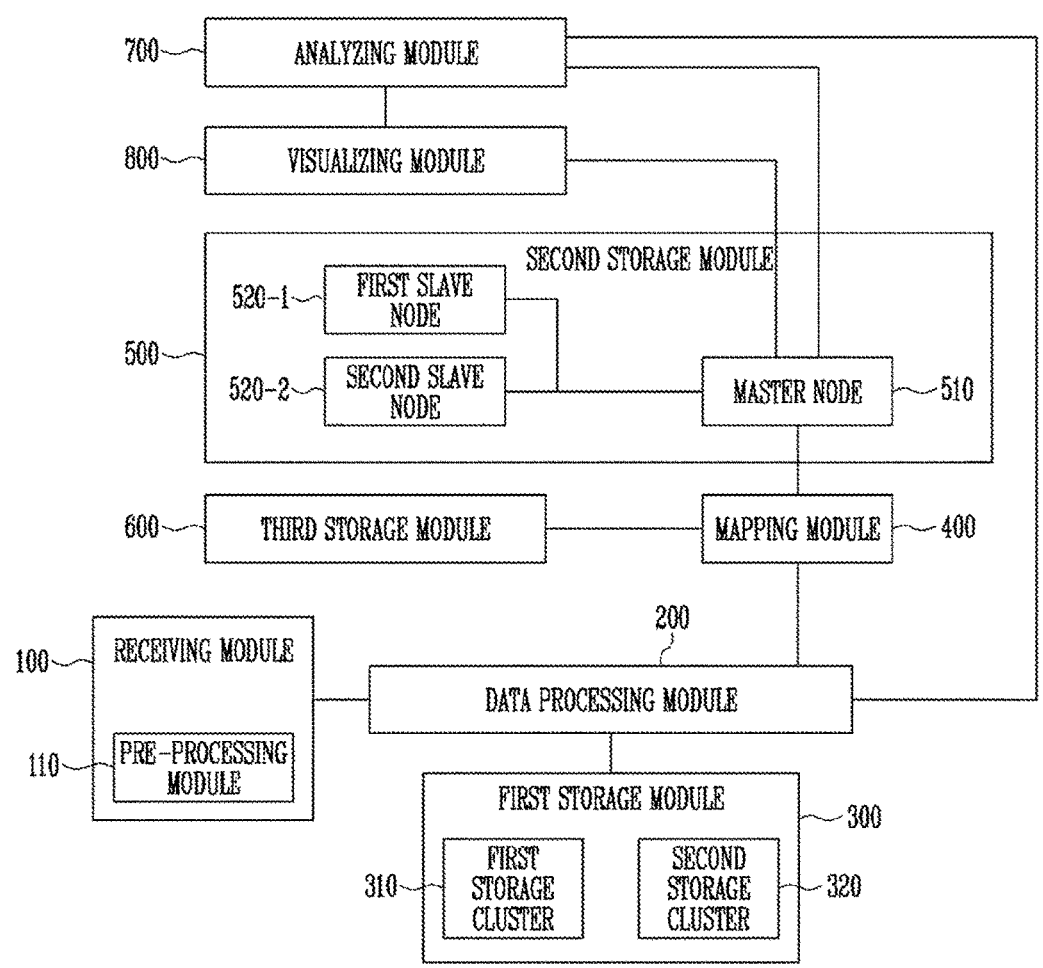
FIG. 1 is a block diagram for explaining an apparatus for data processing according to an embodiment of the present disclosure.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly connected or accessed to another component or indirectly connected or accessed through another component.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

FIG. 1 is a block diagram for explaining an apparatus for data processing according to an embodiment of the present disclosure. Referring to FIG. 1, the apparatus for data processing includes a receiving module 100, data processing module 200, first storage module 300, mapping module 400, second storage module 500, third storage module 600, analyzing module 700, and visualizing module 800.

The receiving module 100 is a module for receiving first data from external device (not illustrated). For example, the first data may be image data from a satellite where extracting of environment information is not reflected. The receiving module 100 may include a pre-processing module 110 configured to pre-process the first data. The pre-processing includes environment information extraction and the like. In a case where the receiving module 100 includes the pre-processing module 110, the first data may additionally include image data pre-processed by the pre-processing module 110.

The data processing module 200 processes the first data received from the receiving module 100, and generates second data and third data from the first data. The generating of the second data and third data may be processed in parallel. The data processing module 200 transmits the second data and third data to the first storage module 300, and transmits the first data and second data to the mapping module 400. Herein, in a case where the first data is image data from a satellite, the second data may include meta data (for example, photographing time, coordinates, resolution and the like) extracted from the first data. In a case where the data processing module 200 includes an array database cluster, for image analyzing, it is necessary to change the first data to an array type. The first data includes a plurality of sub data, each sub data being re-arrayed based on a coordinate corresponding to each sub data. The coordinate may be determined based on a location and time corresponding to each sub data. Due to the re-array, the type of the first data has been changed to an array type. The third data includes the first data with its data type changed to the array type.

In a case where the data processing module 200 generates third data in real time while receiving the first data, and the first storage module 300 stores the third data, there is no need to change the type of the first data whenever analyzing is necessary. The analyzing module 700 may receive and analyze pre-stored third data whenever analyzing is necessary. Therefore, the amount of operation needed for analyzing decreases. Furthermore, in a case where there is a large amount of first data, meta data needs to be stored effectively for management. In a case where the data processing module 200 generates second data in real time while receiving the first data and the first storage module 300 stores the second data, the meta data may be effectively stored. The data processing module 200 transmits the second data and third data to the first storage module 300, and transmits the first data to the mapping module 400.

The first storage module 300 stores the second data and third data received from the data processing module 200. The second data and third data may be separated from each other and stored. For example, in a case where the first storage module 300 includes a first storage cluster 310 and second storage cluster 320, in the first storage cluster 310, the second data may be stored, and in the second storage cluster 320, the third data may be stored.

The mapping module 400 changes a system of the first data and second data from the data processing module 200 and generates fourth data and fifth data, and also generates sixth data. Herein, the system includes all the file system, data structure, and directory system and the like. Since the data processing module 200 and the second storage module 500 have different systems from each other, in order to smoothly store the first data and second data from the data processing module 200 to the second storage module 500, it is necessary to change the system of the data to a system being used by the second storage module 500. Since the system of the first data is changed to generate the fourth data, and the system of the second data is changed to generate the fifth data, it is possible to form a mapping between the first data and fourth data and between the second data and fifth data. The sixth data may include mapping data between the first data and fourth data and between the second data and fifth data. The mapping module 400 transmits the fourth data and fifth data to the second storage module 500, and transmits sixth data to the third storage module 600.

The second storage module 500 stores the fourth data and fifth data from the data processing module 200. Furthermore, the second storage module 500 stores the analyzed data from the analyzing module 700. The second storage module 500 includes a master node 510, first slave node 520-1, and second slave node 520-2. The master node 510 delivers the received fourth data, fifth data, and analyzed data to the first slave node 520-1 and second slave node 520-2. The first slave node 520-1 and second slave node 520-2 stores the data received from the master node 510. The master node 510 transmits at least a portion of the fourth data, fifth data, or analyzed data to the first slave node 520-1 and second slave node 520-2, respectively. In such a case where the second storage module 500 stores at least a portion of the fourth data, fifth data and analyzed data repeatedly, data stability is improved. The second storage module 500 may include a Hadoop cluster. The master node 510 may be a master node of the Hadoop cluster, and the first slave node 520-1 and second slave node 520-2 may be slave nodes of the Hadoop cluster. The second storage module 500 may deliver the analyzed data to the visualizing module 800.

The third storage module 600 stores the sixth data from the mapping module 400.

The analyzing module 700 receives the third data and analyzes the same. When the analyzing module 700 transmits a signal requesting the data processing module 200 for the third data, in response to the request signal, the data processing module 200 transmits the third data stored in the first storage module 300 to the analyzing module 700. The analyzing module 700 analyzes the third data and generates analyzed data. However, receiving the third data from the data processing module 200 is a mere example. The analyzing module 700 may receive the third data directly from the first storage module 300. The analyzing module 700 may transmit the analyzed data to the second storage module 500, and also to the visualizing module 800.

The visualizing module 800 visualizes the analyzed data. The visualization module 800 receives the analyzed data from the second storage module 500 or analyzing module 700, and visualizes the received data. A user may obtain information of a graphic format by viewing the visualized data.

Each of the data processing module 200, first storage cluster 310, second storage cluster 320, and master node 510 is realized as a computer system that includes a ROM, RAM, processor (CPU), storage device (HDD, SSD), and interface and the like. Each of the receiving module 100, mapping module 400, first and second slave nodes 520-1, 520-2, third storage module 600, analyzing module 700, and visualizing module 800 may be realized as a computer system explained hereinabove.

FIG. 2 is a flowchart for explaining a method for data processing according to an embodiment of the present disclosure. Hereinbelow, the method for data processing according to the embodiment of the present disclosure will be explained with reference to FIGS. 1 and 2.

At the step of receiving the first data (S1100), the receiving module 100 receives the first data from external device (not illustrated). For example, the first data may include image data from a satellite.

At the step of pre-processing the first data (S1200), the pre-processing module 110 inside the receiving module 100 may pre-process the first data, for example, the image data received by the receiving module 100. The pre-processing includes a process of extracting environmental information. Depending on the type of the first data, the step of pre-processing the first data (S1200) may be omitted. By the step of pre-processing the first data (S1200) being performed, the first data may additionally include the image data pre-processed by the pre-processing module 110.

At the step of generating the second data and third data from the first data (S1300), the data processing module 200 generates the second data and third data from the first data. By the extracting of meta data of the first data, the second data may be generated. By changing the type of the first data to an array type, the third data may be generated.

At the step of generating the fourth data to sixth data from the first data and second data (S1400), the mapping module 400 generates the fourth data to sixth data from the first data and second data. The fourth data is generated by the changing of the system of the first data, and the fifth data is generated by the changing of the second data, and the sixth data includes mapping data between the first data and fourth data and between the second data and fifth data.

The step of storing the first data to sixth data (S1500) will be explained in detail with reference to FIGS. 1 to 3 hereinafter.

At the step of analyzing the third data (S1600), the analyzing module 700 analyzes the third data and generates the analyzed data. After transmitting a signal requesting the data processing module 200 for the third data, the analyzing module 700 receives the third data from the data processing module 200. Otherwise, the analyzing module 700 may directly receive the third data from the first storage module 300. The analyzing module 700 analyzes the received third data and generates the analyzed data.

At the step of storing and visualizing the analyzed data (S1700), the second storage module 500 receives the analyzed data, and a master node 510 transmits at least a portion of the analyzed data to each of the first slave node 520-1 and second slave node 520-2. That is, the second storage module 500 stores the analyzed data, and repeatedly stores at least a portion of the analyzed data. The visualizing module 800 receives and visualizes the analyzed data from the second storage module 500 or analyzing module 700.

FIG. 3 is a flowchart for explaining in detail the step of storing the first data to third data of the method for data processing of FIG. 2. Hereinafter, the step of storing the first data to sixth data (S1500) will be explained with reference to FIGS. 1 to 3.

At the step of storing the second data and third data to the first storage module (S1510), the first storage module 300 stores the second data and third data received from the data processing module 200. In the first storage cluster 310, the second data may be stored, and in the second storage cluster 320, the third data may be stored.

At the step of storing the fourth data and fifth data in the second storage module (S1520), the mapping module 400 transmits the fourth data and fifth data to the second storage module 500. The second storage module 500 includes the master node 510, first slave node 520-1, and second slave node 520-2. The master node 510 transmits at least a portion of the fourth data and fifth data to each of the first slave node 520-1 and second slave node 520-2. That is, the second storage module 500 repeatedly stores at least a portion of the fourth data and fifth data.

At the step of storing the sixth data in the third storage module (S1530), the third storage module 600 stores the sixth data received from the mapping module 400.

The order of performing the step of storing the second data and third data in the first storage module (S1510), the step of storing the fourth data and fifth data in the second storage module (S1520), and the step of storing the sixth data in the third storage module (S1530) may be changed. Furthermore, the step of storing the second data and third data in the first storage module (S1510) may be performed prior to the step of generating the fourth to sixth data from the first data to second data (S1400) according to an embodiment of the present disclosure.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims Therefore, it will be understood by those of ordinary skill in the art that various changes in form and details may be made therein without departing from the spirit and scope of the present invention as defined by the following claims.

What is claimed is:

1. An apparatus for data processing, the apparatus comprising:
   one or more processors that process computer executable program code embodied in non-transitory computer readable storage media, the computer executable program code comprising:
   receiving program code that receives first data;
   data processing program code that processes the first data received from the receiving program code, to generate second data including meta data of the first data, and third data including the first data with its data type changed to an array type;
   mapping program code that changes a system of the first data and second data received from the data processing program code to generate fourth data and fifth data, and to generate sixth data including mapping data of between the first data and fourth data and between the second data and fifth data,
   first storage media that stores the second data and third data provided by the data processing program code;
   second storage media that stores the fourth data and fifth data provided by the mapping program code; and
   third storage media that stores the sixth data provided by the mapping program code,
   wherein the mapping of data is based upon a data system in which the data processing program code operates being different from a data system in which the second storage media operates.

2. The apparatus according to claim 1,
   wherein the second storage media includes a master node, first slave node and second slave node, the master node transmitting at least a portion of the fourth data and fifth data provided by the mapping program code to the first slave node and second slave node, respectively, and the first slave node and second slave node repeatedly store the at least a portion of the fourth data and fifth data.

3. The apparatus according to claim 2, further comprising:
   analyzing program code that analyzes the third data to generate analyzed data; and
   visualizing program code that visualizes the analyzed data,
   wherein the second storage media further stores the analyzed data, and the first slave node and second slave node repeatedly store the at least a portion of the analyzed data, and the analyzed data is provided from the second storage media to the visualizing program code.

4. The apparatus according to claim 2, wherein the first storage media comprises a first storage cluster that stores the second data, and a second storage cluster that stores the third data.

5. The apparatus according to claim 1, wherein the receiving program code comprises pre-processing program code that pre-processes the first data.

6. A method for data processing, the method comprising:
   processing computer executable program code embodied in non-transitory computer readable storage media by one or more processors, the computer executable program code comprising:
   program code that generates first data;
   program code that generates second data and third data from the first data; and
   program code that generates fourth data to sixth data from the first data and second data,
   program code that stores the second data and third data in a first storage media;
   program code that stores the fourth data and fifth data in a second storage media; and
   program code that stores the sixth data in a third storage media,
   wherein at the generating second data and third data, the second data is generated by extracting meta data of the first data, and the third data is generated by changing a data type of the first data to an array type, and at the generating fourth data to sixth data, the fourth data and fifth data are generated by changing a system of the first data and second data, and the sixth data includes mapping data of between the first data and fourth data and between the second data and fifth data, and
   wherein the mapping of data is based upon a data system in which the data processing program code operates being different from a data system in which the second storage media operates.

7. The method according to claim 6, further comprising program code that pre-processes the first data after the first data is received, and the pre-processing the first data is performed prior to the generating second data and third data from the first data.

8. The method according to claim 6, wherein at the storing the fourth data and fifth data in the second storage media the at least a portion of the fourth data and fifth data is repeatedly stored in the second storage media.

9. The method according to claim 6, further comprising, program code that analyzes, after the storing the first data to third data, the third data to generate analyzed data; and
   program code that stores and visualizes the analyzed data.

10. The method according to claim 9, wherein at the storing and visualizing the analyzed data, at least a portion of the analyzed data is repeatedly stored in the second storage media.

* * * * *